Nov. 11, 1969     A. VAN GELDER     3,477,137
QUICK FREEZING OF LIQUIDS FOR DEHYDRATION
Filed March 25, 1968
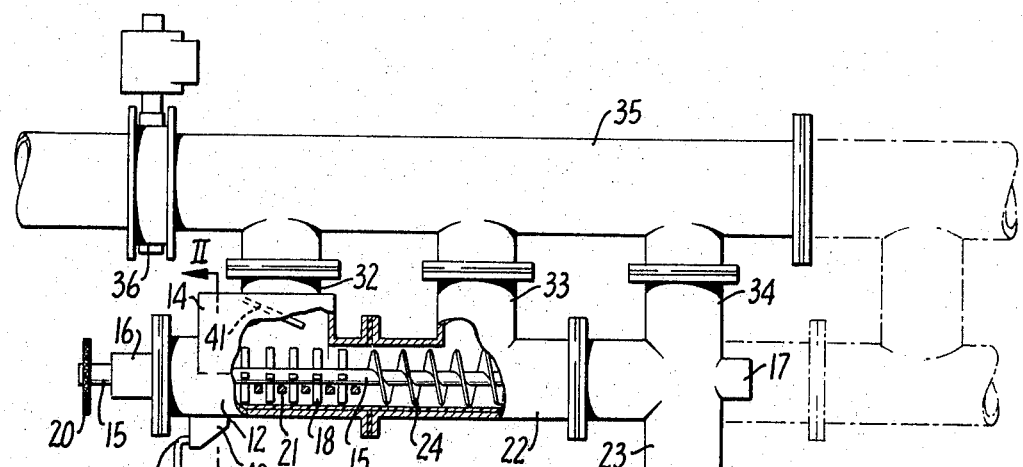
FIG-1.
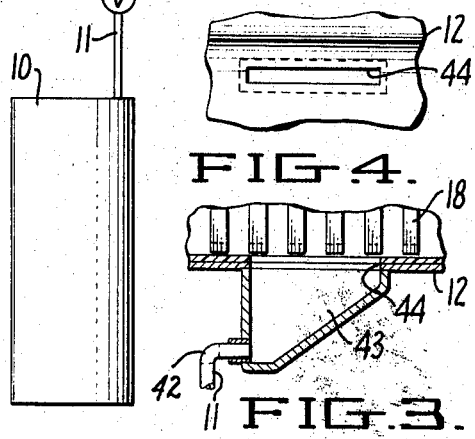
FIG-4.
FIG-3.
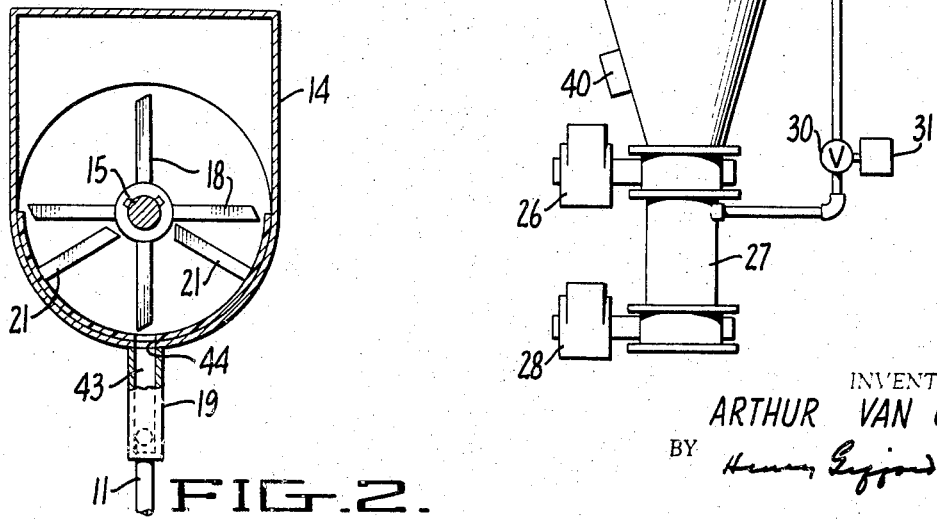
FIG-2.
INVENTOR
ARTHUR VAN GELDER
BY
ATTORNEY United States Patent Office 3,477,137
Patented Nov. 11, 1969

3,477,137
QUICK FREEZING OF LIQUIDS FOR
DEHYDRATION
Arthur van Gelder, Ojai, Calif., assignor to Sun-Freeze,
Inc., Oakview, Calif., a corporation of California
Continuation-in-part of application Ser. No. 607,517,
Jan. 5, 1967. This application Mar. 25, 1968, Ser.
No. 719,299
Int. Cl. F26b 5/10, 17/20
U.S. Cl. 34—5                     5 Claims

ABSTRACT OF THE DISCLOSURE

This invention is directed to preparation of liquids, with or without entrained solids, for subsequent dehydration, by feeding the product into a closed chamber under high vacuum with rapid vapor removal so that there is instantaneous freezing of the material into porous ice chunks, which are simultaneously broken into smaller sizes from pea size to powder, the frozen form being porous in nature throughout. The frozen pieces are then moved through the chamber subjected to the same vacuum vapor removal, care being exercised to insure that no more than 80% of the moisture content is removed by the time it reaches refrigerated storage or passes on for further and final dehydration. The entry of the material must be from the bottom of the treating chamber through an elongated opening, the feed being drawn by the suction of the low pressure in the chamber, interrupted only, if desired, by a proportioning device.

---

This invention finds particular usefulness as a preliminary treatment for the dehydration of foods described and claimed in my copending application Ser. No. 664,186, filed Aug. 29, 1967. This a continuation-in-part of the copending application Ser. No. 607,517 filed Jan. 5, 1967 now abandoned.

Numerous attempts have been made to freeze dry liquid food products such as fruit juices, vegetable juices and the like, but the resulting powders either do not reconstitute quickly or fail to produce the natural food appearance, flavor and aroma which is expected by the consumer. It is therefore an object of the present invention to produce a frozen food product which can then be dehydrated to powder form and be reconstituted quickly in cold water with substantially the same appearance, flavor and aroma as the original fresh juice or liquid. This would also be applicable to vegetable juices and various forms of liquid foods having suspended or colloidal solids.

It is also well known that it is exceedingly difficult to produce a dairy product such as milk, flavored milks and the like, in powdered form which will reconstitute in cold water instantly without flavor changes and without separation or damage to the fat content of the dairy liquids. It is an object of the present invention to produce a quick frozen dairy product which does not cause a separation of or damage to the fatty content, and which can be dehydrated to powder form with indefinite keeping qualities.

It is a further object to produce coffee and tea products which can be dehydrated to powder form and reconstitute immediately in cold or hot water with the same flavor, aroma and appearance as the fresh coffee or tea.

It is known that a cube of ice has only the eight exposed sides. Should this cube be porous, a very large surface area becomes exposed. It is therefore an object of this invention to produce ice containing solids of great porosity so that when it is subjected to heat under high vacuum, the water vapor can pass from any part of the cube to its surface easily, thereby providing more rapid dehydration.

It is also a further object of this invention to prepare products for dehydration by quick freezing without damaging their properties or causing separation of any of their constituents.

It is a further object to provide a frozen liquid preparatory to dehydration in the form of frozen chunks which are porous in nature and friable and in which the individual particles which make up the mass vary in size from powder to pea size are porous throughout.

Still another object of the present invention is to produce a frozen liquid product for subsequent dehydration which reduces the residence time for dehydration to a substantial degree.

Further objects are to provide a construction of maximum simplicity, economy and ease of assembly and disassembly, also such further objects, advantages and capabilities as will fully appear and as are inherently possessed by the device and invention described herein.

The invention further resides in the combination, construction and arrangement of parts illustrated in the accompanying drawings, and while there is shown therein a preferred embodiment thereof, it is to be understood that the same is illustrative of the invention and that the invention is capable of modification and change and comprehends other details of construction without departing from the spirit thereof or the scope of the appended claims.

In the drawings:

FIGURE 1 shows a schematic vertical layout of the plant for making and holding the frozen porous product which is preliminary to vacuum dehydration with an extension into two units shown in broken lines;

FIGURE 2 is a vertical section taken on the line II—II of FIGURE 1;

FIGURE 3 is a sectional elevational view of the inlet on an enlarged scale; and

FIGURE 4 is a diagrammatical showing of the slot inlet in plan view.

Referring now to the drawings in which like reference numerals in the several views indicate like parts, and with particular reference to FIGURE 1, it is to be noted that only one unit is shown. It is contemplated, however, that there may be multiple units as indicated by the broken lines, connected to a common manifold carrying off the liquid vapors, but each unit being a separate operating entity. The storage tank for the fresh liquid is indicated as 10. The proportioning device (not shown) may be used to meter the fresh liquid product through line 11 to a chamber 12 if this is indicated as useful. However, the flow of liquid is adequate due to the very low pressure or high vacuum within the chamber 12. To accomplish this feed flow which will not be clogged with ice and stop the continuous operation a new slot feed entry 41 has been devised which produces a unique and unexpected result. The feed from the reservoir 10 through line 11 turns at right angles at 42 and enters into the feed chamber 43. This chamber is rectangular in section, having at its top a relatively narrow slot 44. This in turn enters the chamber 12 through a corresponding slot at the bottom of the chamber 12 as shown in FIGURE 1. The chamber 12 may be cylindrical in shape as shown and is provided with an internally connecting box-like structure 14 which accommodates the expansion of the frozen product at this point. Means not shown, are provided for access and suitable cleaning. Axially of the chamber 12 is a shaft 15, which shaft is journaled in vacuum tight bearings 16 and 17. Within the chamber 12 spikes 18 are radially secured to the shaft 15 at the product entry end and rotate with the shaft. The shaft 15 is continuously rotated by the sprocket 20 connected to any suitable prime mover for positive continuous and substantially uniform rotation at the speed setting. The drive for the sprocket 20 may be a variable speed motor so that the speed of rotation can be adjusted in accordance with the requirements of the product undergoing this preliminary treatment. Also at the entry end of chamber 12 and cooperating with the rotating spikes 18 are radially upstanding stationary spikes 21 which are secured at spaced intervals from each other on the interior so as to permit the rotating spikes 18 on the shaft 15 to pass therebetween in close proximity thereto. Within the chamber 14, and shielding the vapor outlet 32 is an angular baffle 41.

Chamber 12 is directly connected to chamber 22 which is a continuation thereof and which in turn is connected with the T-shaped chamber 23. On the shaft 15 within chambers 22 and 23 there is a helical screw conveyor 24 which moves the material in the direction of the arrow to the vertical drop in chamber 23. The vertical drop of chamber 23 is in direct communication and contact with holding tank 25, at the delivery end of which there is an air lock valve 26, an intermediate delivery passage 27 and a final delivery air lock valve 28. Connected with the tank 25 and the passage 27 is a valve 30 operated by a solenoid 31 operative to balance and equalize the vacuum in the tank 25 and in the passage 27, to avoid any sudden rush of air in one direction or the other.

Each of the chambers 12, 22 and 23 is provided with a vapor outlet 32, 33 and 34 respectively, for discharge of the water vapor into a common manifold 35. The manifold 35 is connected to a source of high vacuum (not shown) and also to appropriate condensers, all of which are standard procedure. To isolate the unit from the vacuum and condensers, an isolation valve 36 is interposed in the manifold shutting off all operations to this unit.

Operation of the device is as follows. The liquid, whether it is clear, colloidal or solids in suspension, is fed from the supply tank 10 upwardly through the line 11 into the feed chamber 43, through the elongated slot 44 and into the chamber 12 and swept by the pins 18. If the flow is to be metered a proportioning pump may be used, but this is not usually necessary. At this point the liquid passes from room temperature into the vacuum maintained in the system of from 2,000 to 100 microns of mercury. A vacuum above or below this range is exceedingly difficult to handle and make the apparatus function, and certainly operating outside of this range affects the efficiency of the unit. At the moment of entry through the slot 44 there is a flash freezing or instantaneous freezing, the product almost literally explodes into ice clusters or chunks of a porous nature, to the extent that at least fifteen percent of the vapor is eliminated from the product at the moment of entry into chamber 12. The rapid freezing is caused by a massive and rapid evaporation which process removes the heat from the liquid resulting in a differential vapor pressure between the liquid and the vacuum. This evaporation continues until the dew point of the operating pressure is reached. For example, at a pressure of 100 microns of mercury the product will continue evaporating until it has reached a temperature of about minus 40° F. which temperature is reached almost instantaneously upon delivery to the tube. Of course, the removal of water vapor continues in chambers 12, 22 and 23 until the frozen product has 80 percent or less of the moisture removed. In liquids with entrained solids if more than 80% of the moisture is removed then the product becomes "taffy" and cannot be moved. On the other hand, when a liquid is undergoing treatment, if more than 80% of the moisture is removed, it becomes so light and feathery that it is removed by the vapor flow through 33 and 34 and is lost. The vapor from chamber 12 is taken off through the connection 32 to the manifold 35 and thence to the condenser. There is a momentary buildup of ice chunks, the expanded volume of which is temporarily accommodated by the box 14. The water vapor in leaving the ice chunks so rapidly creates vapor channels throughout the entire chunk becomes sponge-like with a noticeable porosity. The rotation of the pins 18 in combination with the stationary pins 21, continuously breaks up any buildup of the chunks, which are readily friable, into granules sized from powder to pea size. Each granule, like the chunk, is laced with channels left by the removal of the vapor so that the particles themselves are also porous. Because of the explosive and ebullient nature of the instantaneous freezing of the product, a baffle 45 is provided at the top of chamber 14, shielding the opening to vapor take-off 32, to prevent inadvertent removal of the frozen product and separate the frozen product from the vapor take-off.

The manner of delivery of the product to the chamber 12 is of unexpected and critical importance. In the first place the slot 44 provides a self-clearing or releasing means which does not freeze up and stop operation. Certain areas within the slot may freeze and block part of the passage for a short time but the warmer entering liquid through the remainder of the slot soon frees the material and thus self-cleaning is accomplished. This phenomenon is aided by the observed nature of the instantaneous freezing of the entering material. The instantaneous freezing under high vacuum is so violent and explosive that only the top portion of each increment of feed is thus frozen, leaving a liquid base forming the next increment. This means that there is always liquid feed in the chamber 43 and very nearly always in the feed slot 44. Under the operating conditions defined herein it would be quite impossible for the feed to be otherwise than at the bottom or otherwise than a slot. The material enters the chamber 12 at substantially zero velocity and is instantaneously subjected to the operating conditions. There is no appreciable or deleterious buildup of a frozen skin inside the chamber 12 or frozen chunks within the chamber and blades or spikes 18 and 21 are not primarily scrapers but perform their real function of breaking up the immediately formed ice chunks into smaller sized pieces and particles.

The broken ice chunks in the form of frozen particles or pieces are then delivered by the screw conveyor 24 through the chamber 22 where they are again subjected to removal of water vapor under vacuum. It is to be observed that there is constant movement of the particles and pieces through the chambers 12 and 22 due to the vapor velocity plus the continued decrease in specific gravity. The vapor from chamber 22 leaves through the connector 33 to the common manifold 35 and thence to the condenser (not shown). The capacity of this equipment is determined by the speed at which the water vapor can be removed. Therefore, the larger the vapor removal opening, the greater the capacity of the equipment. This same movement by screw conveyor 24 through chamber 23 continues and at the same time is being subjected to vapor removal under vacuum with high velocity. As indicated earlier, no more than 80% of water vapor is removed, and so this is not to be construed as a dehydrating method or apparatus. Upon delivery at the end of chamber 23 the frozen porous particles drop into a holding tank or bin 25 and pack down in the bottom thereof. Any heat coming from the outside of the tank 25 may cause some melt but this melt is refrozen and the water vapor of the refreeze is removed through the tank as this tank is under the same vacuum and connected by connector 34 to the common exhaust manifold 35. The delivery of the frozen porous product from the tank is accomplished through the air lock valve 26 into the passage 27. Since the tank 25 is already under the same vacuum conditions as the entire system, in order to equalize the vacuum in the tank with that of the conveyor line 27, it is necessary to have a valve 30 operated by a solenoid to keep the negative pressures equalized in the system. It is important to note that the product delivered at 23 can be connected directly to a continuous dehydrating system.

The pressure of the pack in the bottom of the tank 25 is sufficient to block the free flow of the frozen porous particles into the line 27. A vibrator 40 may be attached to the outside of the tank adjacent the air lock valve 26 to loosen any packing of the material. The frozen porous products in granular form are released through air lock valve 28 for subsequent treatment and dehydration.

In order to make the system efficient, avoid melt, and maintain certain quick freeze, it is contemplated that the whole system will be suitably insulated, particularly the tank 25.

It is apparent that any number of these units may be established to operate as separate units in a continuous system, as they are simple to operate, and banks of these are contemplated if the remainder of the system warrants. This is shown in broken lines in FIGURE 1. The product produced by this equipment is so porous that it reduces the residence time of the treated material in the vacuum dehydrator by more than fifty percent.

It is also axiomatic that where the particles enter the dehydrator with a porous structure, the residence time is reduced, maintenance of the porous structure and the reconstitution of the article are rendered greater and with more facility and efficiency.

While the description has been directed primarily to food products, the method is applicable to whole blood without causing separation of the plasma, and to pharmaceutical or biological products where the quick freezing is so effective that the original characteristics are not altered in any way except form.

I claim:

1. In the method of quick freezing liquids preparatory to vacuum dehydration including those liquids containing solid particles, the steps of introducing the liquid through a continuously open elongated slot into a chamber having a high vacuum with massive and rapid withdrawal of released water vapor, the feed being drawn into the chamber by the low pressure therein, instantaneously establishing a substantial differential vapor pressure between the liquid and the vacuum to instantaneously freeze the same into expanded ice clusters while reducing the water content by approximately 15%, immediately breaking up the ice clusters into the form of frozen particles preferably not larger than pea size, and delivering said particles in frozen state with 80% or less moisture removal and under the same high vacuum and vapor removal for further dehydration.

2. The process of claim 1 where the freezing and the vapor removal are so rapid as to make the resulting ice clusters porous throughout.

3. The method of quick freezing liquids including those containing solid particles, the steps of introducing the liquids at atmospheric pressure and room temperature through a continuously open elongated slot into the bottom of a chamber under vacuum of from 2,000 to 100 microns of mercury to instantaneously freeze the liquid into porous clusters, simultaneously removing the released water vapor massively at a very rapid rate, continuously breaking up the porous clusters into particles sized from powder to pea size, each particle also being porous throughout, and continuously delivering said particles in a frozen state and under the same vacuum and rapid withdrawal of released water vapor for further vacuum dehydration, all without removing more than 80% of the water content.

4. Apparatus for the quick freezing of liquids preparatory to further dehydration in combination a storage receptacle for maintaining the liquid to be treated at atmospheric pressure, a feed line delivering said product to a feed chamber, a feed chamber having a rectangular elongated slot for the delivery of said product to a first section of a vacuum chamber, a cylindrical vacuum chamber having two continuous and communicating sections, a first section having an enlarged portion for accommodating increased internal volume and radially directed spaced internal fixed spikes secured to the inner surface of said cylinder, a second section in full area communication with said first section, a rotating shaft extending axially through both sections of said cylindrical vacuum chamber having radially directed spikes spaced along the portion within the said first section for rotation therewith between the fixed spikes, and a helical screw through the entire second section, a manifold for withdrawing the released water vapor at a very rapid rate from both sections of said vacuum chamber, fully communicating coupling means for continuously connecting the cylindrical sections to the manifold, means for establishing and maintaining a vacuum of from 2,000 to 100 microns of mercury in said manifold, and delivery means at the end of said second section for delivery of the frozen, partially dehydrated particles.

5. The apparatus of claim 4 including refrigerating means for temperature control of the negative pressure maintained in the system.

References Cited
UNITED STATES PATENTS

| | | | |
|---|---|---|---|
| 2,411,152 | 11/1946 | Folsom | 34—5 |
| 2,439,384 | 4/1948 | Fetzer | 34—5 X |
| 3,088,222 | 5/1963 | Mace et al. | 34—92 |

WILLIAM E. WAYNER, Primary Examiner

U.S. Cl. X.R.

34—92; 62—320